United States Patent
Hotta et al.

(10) Patent No.: US 10,319,992 B2
(45) Date of Patent: Jun. 11, 2019

(54) ELECTRODE FOR NONAQUEOUS ELECTROLYTE SECONDARY BATTERY, NONAQUEOUS ELECTROLYTE SECONDARY BATTERY, AND BATTERY PACK

(71) Applicant: Kabushiki Kaisha Toshiba, Minato-ku (JP)

(72) Inventors: Yasuyuki Hotta, Ota (JP); Tomokazu Morita, Funabashi (JP); Takashi Kuboki, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 504 days.

(21) Appl. No.: 15/075,818

(22) Filed: Mar. 21, 2016

(65) Prior Publication Data

US 2016/0285082 A1 Sep. 29, 2016

(30) Foreign Application Priority Data

Mar. 24, 2015 (JP) .................. 2015-061310

(51) Int. Cl.
| | |
|---|---|
| *H01M 4/36* | (2006.01) |
| *H01M 4/131* | (2010.01) |
| *H01M 4/133* | (2010.01) |
| *H01M 4/587* | (2010.01) |
| *H01M 4/62* | (2006.01) |
| *H01M 10/0525* | (2010.01) |
| *H01M 10/42* | (2006.01) |
| *H01M 4/38* | (2006.01) |
| *H01M 4/134* | (2010.01) |
| *H01M 4/485* | (2010.01) |
| *H01M 4/02* | (2006.01) |

(52) U.S. Cl.
CPC ........... *H01M 4/364* (2013.01); *H01M 4/131* (2013.01); *H01M 4/133* (2013.01); *H01M 4/134* (2013.01); *H01M 4/38* (2013.01); *H01M 4/386* (2013.01); *H01M 4/485* (2013.01); *H01M 4/587* (2013.01); *H01M 4/622* (2013.01); *H01M 10/0525* (2013.01); *H01M 10/4257* (2013.01); *H01M 2004/027* (2013.01); *H01M 2220/30* (2013.01)

(58) Field of Classification Search
CPC ........ H01M 4/364; H01M 4/38; H01M 4/386; H01M 4/587; H01M 4/622; H01M 4/133; H01M 4/134; H01M 10/0525; H01M 10/4257; H01M 2004/027; H01M 2220/30

See application file for complete search history.

(56) References Cited

U.S. PATENT DOCUMENTS

| | | | |
|---|---|---|---|
| 2007/0264568 A1* | 11/2007 | Ryu | ............... H01M 4/622 429/213 |
| 2009/0305139 A1 | 12/2009 | Oh et al. | |
| 2013/0078490 A1 | 3/2013 | Morita et al. | |

FOREIGN PATENT DOCUMENTS

| | | |
|---|---|---|
| JP | 11-250915 A | 9/1999 |
| JP | 2003-157851 A | 5/2003 |
| JP | 2007-500421 A | 1/2007 |
| JP | 2009-507338 A | 2/2009 |
| JP | 2010-503174 A | 1/2010 |
| JP | 2012-212621 A | 11/2012 |
| JP | 2013-73764 A | 4/2013 |
| JP | 2013-105549 A | 5/2013 |
| WO | WO 03/018687 A2 | 3/2003 |

* cited by examiner

*Primary Examiner* — Laura Weiner
(74) *Attorney, Agent, or Firm* — Oblon, McClelland, Maier & Neustadt, L.L.P.

(57) ABSTRACT

In one embodiment, an electrode for a nonaqueous electrolyte secondary battery has an electrode mixture layer comprising an active material, a conductive agent, and a binding agent to bind the active material and the conductive agent, and a collector on which the electrode mixture layer is laminated. The active material comprises a composite body comprising at least a carbonaceous material, and a metal dispersed in the carbonaceous material or an oxide of the metal. And the binding agent is a polyvinyl alcohol resin of a saponification degree of 87-99.9 mole %.

15 Claims, 2 Drawing Sheets

ELECTRODE FOR NONAQUEOUS ELECTROLYTE SECONDARY BATTERY, NONAQUEOUS ELECTROLYTE SECONDARY BATTERY, AND BATTERY PACK

CROSS-REFERENCE TO RELATED APPLICATION

This application is based upon and claims the benefit of priority from the prior Japanese Patent Application No. 2015-061310, filed on Mar. 24, 2015, the entire contents of which are incorporated herein by reference.

FIELD

Embodiments described herein relate generally to an electrode for a nonaqueous electrolyte secondary battery, a nonaqueous electrolyte secondary battery, and a battery pack.

BACKGROUND

Recently, various portable electronic devices have become widespread, by the rapid development of a miniaturization technology of an electronics device. And miniaturization is also required for batteries which are power sources for these portable electronic devices, and a nonaqueous electrolyte secondary battery having a high energy density has attracted attention.

A nonaqueous electrolyte secondary battery using metal lithium as a negative electrode active material has an extremely high energy density, but since a resinous crystal called dendrite is separated on a negative electrode at the time of charging, battery life is short, and there was also such a problem in safety that dendrite grows and reaches a positive electrode to cause internal short-circuit. Accordingly, as a negative electrode active material for replacing lithium metal, a carbon material to insert/extract lithium, particularly graphite carbon has been used.

In addition, as a negative electrode active material pursuing a further high energy density, an effort has been made to use particularly an element which is alloyed with lithium, such as silicon, tin, or a material having a large lithium insertion capacity and a high density, such an amorphous chalcogen compound. Among them, silicon can insert lithium up to a ratio of 4.4 lithium atoms to 1 silicon atom, and a negative electrode capacity per mass thereof is about 10 times that of graphite carbon. But regarding silicon, change of the volume in accompany with insertion/extraction of lithium in a charge/discharge cycle is large, and there was a problem in a cycle life such as pulverization of active material particles.

DETAILED DESCRIPTION

Hereinafter, embodiments will be described.

(First Embodiment)

Figure 1:
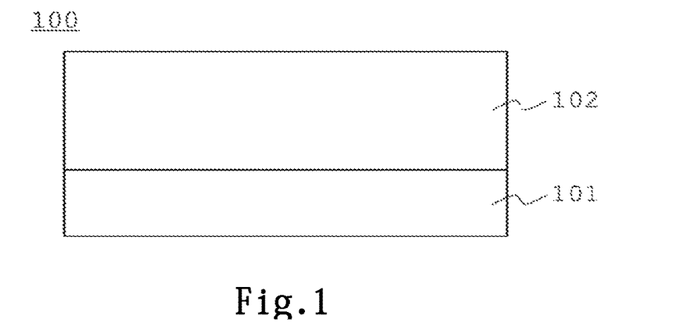
FIG. 1 is a conceptual diagram of an electrode of a first embodiment.

An electrode of a first embodiment has a structure that an electrode mixture layer containing an electrode active material is laminated on one surface or both surfaces of a collector. The electrode for a nonaqueous electrolyte of the first embodiment is used as a negative electrode, for example. FIG. 1 shows a sectional conceptual diagram of a negative electrode using the electrode of the first embodiment. A negative of FIG. 1 is composed of a collector 101, and a negative electrode mixture layer 102 formed on one surface of the collector 101.

The negative electrode mixture layer 102 of the first embodiment is composed of a negative electrode active material, a conductive agent, and a binding agent to bind the negative electrode active material and the conductive agent. An additive agent such as a conductive agent may be contained in the negative electrode mixture layer 102.

A thickness of the negative electrode mixture layer 102 is preferably in a range of not less than 1 µm, and not more than 150 µm. The reason is because, if the thickness is thinner than 1.0 µm, since a volume occupied by the mixture layer in a battery becomes smaller, a target capacity cannot be obtained, and if it is thicker than 150 µm, when an electrode group is manufactured by combining with a positive electrode described later, malfunction on manufacturing is caused such that winding property is deteriorated. Accordingly, when the negative electrode mixture layers 102 are carried on the both surfaces of the negative electrode collector 101, the total thickness thereof becomes in a range of not less than 2 µm, and not more than 300 µm. A more preferable range of a thickness at one side is not less than 20 µm, and not more than 100 µm. When the thickness is in this range, a large current discharge characteristic and a cycle life are greatly improved.

Regarding a mixing ratio of the negative electrode active material, the conductive agent and the binding agent in the negative electrode mixture layer 102, it is preferable to set ranges of, not less than 57 mass % and not more than 95 mass % for the negative electrode active material, not less than 3 mass % and not more than 20 mass % for the conductive agent, and not less than 2 mass % and not more than 40 mass % for the binding agent, because an excellent large current discharge characteristic and cycle life can be obtained.

As the negative electrode active material in the first embodiment, a carbonaceous material [cokes, graphites (natural graphite, artificial graphite, or the like), thermal decomposition carbons, a sintered body of an organic polymer compound, carbon fiber, active coal] which can insert/extract lithium metal, lithium alloy, and lithium, and at least not less than one kind of element selected from a group consisting of Si, Sn, Al, In, Ga, Pb, Ti, Ni, Mg, W, Mo, and Fe, an alloy thereof and its oxide can be used. Here, in the sintered body of an organic polymer compound that is an element of an active material particle, organic resin may be a phenol resin cured material as a precursor.

Out of these, a desirable aspect of the negative electrode active material according to the first embodiment is a composite body comprising a carbonaceous material, and a metal or an oxide of the above-described metal dispersed in the above-described carbonaceous material. Specifically, the negative electrode active material is a particle in which composite bodies are finely compounded. Here, in the composite body, microcrystal Si is dispersed in the carbonaceous material, in the state that the microcrystal Si is contained or held in a Si oxide phase containing $SiO_2$ which is tightly bound with Si, in an active material formed by compounding and burning minute silicon monoxide and carbonaceous material. Further, a ratio of a carbon component on the surface of the above-described negative electrode active material is 40-90 mol %.

In addition, an average size of the silicon oxide phase which holds and contains Si is preferably not less than 50 nm, and not more than 1000 nm, and also the silicon oxide phase preferably exists to be dispersed in the carbonaceous material in a uniform state that, in a standard deviation in which the size distribution is defined as (d84%−d16%)/2, a value of (standard deviation/average size) is not more than 1.0.

A large amount of lithium is inserted in and extracted from the silicon phase, and thereby the silicon phase increases a capacity of the negative electrode active material. Expansion and contraction caused by insertion/extraction of a large amount of lithium into the silicon phase is alleviated, by dispersing the silicon phase into the silicon oxide phase and the carbonaceous material, and thereby the active material particles are prevented from being pulverized, and in addition, the carbonaceous material phase ensures the conductivity important as the negative electrode active material, and the silicon oxide phase is tightly bound with silicon, and has a large effect for maintaining the particle structure, as a buffer for holding micronized silicon.

The silicon phase largely expands and contracts at the time of inserting and extracting lithium, and accordingly in order to reduce this stress, the silicon phase is preferably miniaturized and dispersed as much as possible. Specifically, the silicon phase is preferably dispersed in a cluster of several nm, to a size of not more than 100 nm even if it is large.

The silicon oxide phase has an amorphous structure, a crystalline structure or the like, and is preferably dispersed uniformly in the active material particles in a state that it combines with the silicon phase and contains or holds the silicon phase. But, the Si microcrystals held by the silicon oxide combine with each other and thereby a crystallite size grows, while repeating volume change by inserting and extracting Li at the time of charge/discharge, and thereby capacity decrease and initial charge/discharge efficiency reduction are caused. Accordingly, in the present invention, a size of the silicon oxide phase is made small and uniform, and the growth of the crystallite size of the microcrystal Si is blocked, and thereby capacity deterioration due to the charge/discharge cycle is suppressed, and the life characteristic is improved. The preferable average size of the silicon oxide phase is in a range from 50 nm to 1000 nm. In addition the size of the phase is a value of a diameter of the circle, when a section of the phase is converted into a circle having an area corresponding to an area of the cross section of the phase. If larger than this range, an effect for suppressing the growth of the size of the microcrystal Si cannot be obtained. In addition, if smaller than this range, at the time of manufacturing the active material, it becomes difficult to disperse the silicon oxide phase, and in addition, problems such as the decrease in the rate characteristic due to the reduction of the conductivity as the active material, and the decrease in the initial charge/discharge capacity efficiency are caused. More preferably, the average size is not less than 100 nm and not more than 500 nm, and if the average size is in this range, it is possible to obtain a particularly good life characteristic. In addition, in order to obtain a good characteristic as the whole active material, the size of the silicon oxide phase is preferably uniform, and when 16% accumulation diameter of the volume component is d16%, and 84% accumulation diameter thereof is d84%, and for a standard deviation indicated by (d84%−d16%)/2, a value of (standard deviation/average size) is preferably not more than 1.0, and further, when this value is not more than 0.5, an excellent life characteristic can be obtained.

As the carbonaceous material which is compound with the silicon phase and the silicon oxide phase in the particle, graphite, hard carbon, soft carbon, amorphous carbon, or acetylene black or the like may be used, and one or a mixture of several kinds may be used, and preferably only graphite, or a mixture of graphite and hard carbon may be used. Graphite is preferable in the point to enhance conductivity of an active material, and coats the whole hard carbon active material, and thereby has an effect to largely reduce the expansion and contraction thereof. The carbonaceous material is preferably in a shape to include the silicon phase, and the silicon oxide phase. In addition, in a composite body in which the silicon oxide phases of a micro particle is dispersed, in order to hold the structure of the particle, and prevent aggregation of the oxide silicon phase, and ensure the conductivity, the composite body preferably contains carbon fiber. Accordingly, it is effective, if a diameter of the carbon fiber to be added is about the same size as the silicon oxide phase, and the average size thereof is preferably not less than 50 nm, and not more than 1000 nm, and more preferably, it is not less than 100 nm, and not more than 500 nm. The content amount of the carbon fiber is preferably in a range of not less than 1 mass, and not more than 8 mass %, and more preferably, it is in a range of not less than 0.5 mass %, and not more than 5 mass %.

In addition, lithium silicate such as $Li_4SiO_4$ may be dispersed on the surface or the inside of the silicon oxide phase. It is thought that lithium salt added to the carbonaceous material is subjected to heat treatment, and thereby solid reaction with the silicon oxide phase in the composite body is caused to form lithium silicate.

In the carbonaceous material of a structure to cover the silicon phase and the silicon oxide phase, a $SiO_2$ precursor and a Li compound may be added. These materials are added in the carbonaceous material, and thereby the binding of $SiO_2$ generated from the silicon monoxide and the carbonaceous material is strengthened, and $Li_4SiO_4$ excellent in Li ion conductivity is generated in the silicon oxide phase. As the $SiO_2$ precursor, alkoxide such as silicon ethoxide can be listed. As the Li compound, lithium carbonate, lithium oxide, lithium hydroxide, lithium oxalate, lithium chloride can be listed.

It is preferable that a particle diameter of the negative electrode active material is not less than 5 μm, and not more than 100 μm, and a specific surface area thereof is not less than 0.5 $m^2/g$, and not more than 10 $m^2/g$. The particle diameter and the specific surface area of the active material affect an insertion/extraction reaction of lithium, and have a significant effect to the negative electrode characteristic, but if they are values within these ranges, the active material can stably exert its characteristic.

In addition, a half-value width of a diffraction peak on a Si (220) surface in a powder X-ray diffraction measurement of the active material is preferably not less than 1.5°, and not less than 8.0°. The half-value width of the diffraction peak on the Si (220) surface becomes smaller, as the crystal particle of the silicon phase grows more, and when the crystal particle of the silicon phase grows large, breaking might easily be generated in the active material particle, in accordance with expansion and contraction in accompany with the insertion/extraction of lithium, but if the half-value width is within the range of not less than 1.5°, and not less than 8.0°, it can be avoided that such a problem is revealed.

Regarding a ratio among the silicon phase, the silicon oxide phase, the carbonaceous material phase, a mole ratio of Si and carbon is preferably in a range that $0.2 \leq Si/carbon \leq 2$. Regarding the quantitative relation between the silicon phase and the silicon oxide phase, it is preferable that the mole ratio thereof is $0.6 \leq Si/SiO_2 \leq 1.5$, because a large capacity and an excellent cycle characteristic can be obtained as the negative electrode active material.

In addition, the negative electrode mixture layer 102 may contain a conductive agent. As the conductive agent, acetylene black, carbon black, graphite or the like can be listed.

As the collector 101, a conductive substrate of a porous structure or a nonporous conductive substrate can be used. These conductive substrates can be formed of copper, stainless-steel or nickel, for example. A thickness of the collector 101 is preferably not less than 5 μm, and not more than 20 μm. This is because, if the thickness is in this range, the balance between electrode strength and weight saving can be obtained. Out of these substrates, copper containing copper alloy is the most preferable from the point of conductivity.

The negative electrode mixture layer 102 contains a binding agent for binding the negative electrode materials to each other. As the binding agent, polyvinyl alcohol resin with a saponification degree of 87-99.9 mole % is used. The polyvinyl alcohol resin is a resin obtained by polymerizing vinyl ester monomers such as vinyl acetate.

As the polymerization method, a publicly-known method such as a massive polymerization method, a solution polymerization method, a emulsion polymerization method, a suspension polymerization method can be listed. As an initiator to be used in the polymerization, a publicly-known initiator, such as N, N'-azobisisobutyronitrile, benzoyl peroxide, ammonium persulfate, n-propyl peroxycarbonate can be listed. Regarding a polymerization temperature, there is no limitation, in particular, but a range of −30-150° C. is proper as the polymerization temperature.

The monomer to be used is basically vinyl acetate, but may contain a vinyl alcohol unit, a vinyl ester unit, and other monomer units, if each is contained in a range not to impair the effect of the present invention. As the unit like this, acrylic acid, methacrylic acid, crotonic acid, angelic acid, tiglic acid, and phthal acid, maleic acid, itaconic acid, and unsaturated acids, such as an anhydride thereof, or a salt thereof, or vinyl cyanides, such as α-olefines, acrylonitrile, methacrylonitrile, vinyl halides, such as vinyl chloride, vinylidene chloride, vinyl fluoride, vinylidene fluoride, vinyl bromide, acrylamides, such as acrylamide, N, N-dimethylacrylamide, methacrylamide, N, N-dimethylmethacrylamide, N-vinylamides, such as N-vinylpyrrolidone, and allyl ethers, such as allyl acetate, propylallyl ether, butylallyl ether, can be listed.

In addition, after the saponification, acetalization denaturation with aldehydes may be performed to a monomer unit of 0.1-13 mole %.

A saponification reaction is performed in a state to be dissolved in alcohol, for example. As a catalyst to be used for the saponification reaction, a hydroxide of an alkali metal, such as potassium hydroxide, sodium hydroxide, an alkali compound, such as sodium methoxide derived from alcohol, or an acid, such as a mineral acid like hydrochloric acid, phosphorous acid is used.

Regarding a measuring method of a saponification degree, it can easily be measured, by the method described in JIS K0070 "test method of acid value, saponification value, ester value, iodine value, hydroxyl value of chemical products, and non-saponified products". Regarding extraction from a battery back, a negative electrode is taken out by a definite amount, and is washed/dried by methyl ethyl carbonate or the like, and then is subjected to extraction with hot water, and is re-precipitated with alcohol such as methanol, and thereby a polyvinyl alcohol resin as a binder can be extracted. A saponification degree thereof can be measured again by the method described in JIS K0070.

In addition, as the binding agent, two or more materials may be used by combining them, and polysaccharide, such as polytetrafluoroethlene (PTFE), polyvinylidene fluoride (PVdF), polyacrylic acid, algin acid, cellulose, and its derivative, ethylene-propylene-diene copolymer (EPDM), styrene-butadiene rubber (SBR), polyimide, polyamide, polyamide-imide or the like can be used together.

(Second Embodiment)

A nonaqueous electrolyte secondary battery according to a second embodiment will be described.

A nonaqueous electrolyte secondary battery according to a second embodiment is provided with an exterior material, a positive electrode which is housed in the external material, a separator which is housed in the external material, a negative electrode, containing an active material, which is housed in the external material spatially separately from the positive electrode, with the separator being interposed therebetween, and nonaqueous electrolyte filled in the exterior material.

Figure 2:
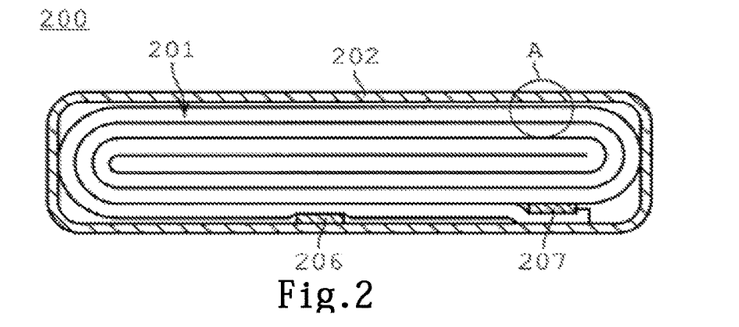
FIG. 2 is a conceptual diagram of a nonaqueous electrolyte secondary battery of a second embodiment.
Figure 3:
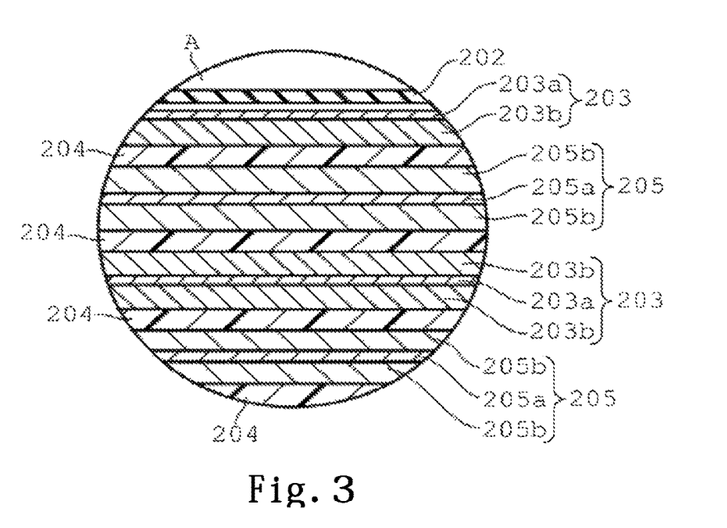
FIG. 3 is an enlarged conceptual diagram of the nonaqueous electrolyte secondary battery of the second embodiment.

A nonaqueous electrolyte secondary battery 200 according to the embodiment will be described in detail, with reference to conceptual diagrams of FIG. 2, FIG. 3 showing an example thereof. FIG. 2 is a conceptual sectional diagram of the flat nonaqueous electrolyte secondary battery 200 with a bag-like exterior material 202 composed of a laminate film, and FIG. 3 is an enlarged sectional diagram of an A portion of FIG. 2. In addition, each diagram is a conceptual diagram for explanation, and the shape, dimension and ratio thereof may be different from those of the actual device, but it is possible to appropriately change the design of these by taking into consideration of the following description and prior arts.

A flat wound electrode group 201 is housed in the bag-like exterior material 202 composed of a laminate film in which an aluminum foil is interposed between two resin layers. The flat wound electrode group 201 is formed by winding a laminate in which a negative electrode 203, a separator 204, a positive electrode 205, the separator 204 are laminated in this order from the outer side in a spiral shape, and by performing press forming of the wound laminate. The negative electrode 203 at the outermost shell has a structure that a negative electrode mixture layer 203b is formed on one side at an inner surface side of a negative electrode collector 203a as shown in FIG. 3. The other negative electrode 203 is configured such that the negative electrode mixture layers 203 are formed on both sides of the negative electrode collector 203a. An active material in the negative electrode mixture layer 203b contains an active material for the battery 200 according to the second embodiment. The positive electrode 205 is configured such that positive electrode mixture layers 205b are formed on both sides of a positive electrode collector 205a.

At the vicinity of an outer circumferential end of the wound electrode group 201, a negative electrode terminal 206 is electrically connected to the negative electrode collector 203a of the negative electrode 203 at the outermost shell, and a positive electrode terminal 207 is electrically connected to the positive electrode collector 205a of the positive electrode 205 at an inner side. The negative electrode terminal 206 and the positive electrode terminal 207 are extended outside from opening portions of the bag-like exterior material 202. For example, liquid nonaqueous electrolyte is injected from an opening portion of the bag-like exterior material 202. The openings of the bag-like exterior material 202 are heat sealed while the negative electrode terminal 206 and the positive electrode terminal 207 are sandwiched, and thereby the wound electrode group 201 and the liquid nonaqueous electrolyte are completely sealed.

As the negative electrode terminal 205, aluminum or aluminum alloy containing an element of Mg, Ti, Zn, Mn, Fe, Cu, Si or the like can be listed, for example. It is preferable that the negative electrode terminal 206 is made of the same material as the negative electrode collector 203a, so as to reduce a contact resistance with the negative electrode collector 203a.

As the positive electrode terminal 207, a material which is provided with electric stability and electrical conductivity in the state that a potential to a lithium ion metal is in a range from 3V to 4.25 V, can be used.

Specifically, aluminum or aluminum alloy containing an element of Mg, Ti, Zn, Mn, Fe, Cu, Si or the like can be listed. It is preferable that the positive electrode terminal 207 is made of the same material as the positive electrode collector 205a, so as to reduce a contact resistance with the positive electrode collector 205a.

Hereinafter, the bag-like exterior material 202, the positive electrode 205, the negative electrode 203, the electrolyte, the separator 204 which are the constituent members of the nonaqueous electrolyte secondary battery 200 will be described in detail.

1) Bag-like Exterior Material 202

The bag-like exterior material 202 is formed of a laminate film with a thickness of not more than 0.5 mm. Or, as the exterior material, a metal container with a thickness of not more than 1.0 mm is used. More preferably, the metal container has a thickness of not more than 0.5 mm. The reason is because of ensuring a capacity per volume.

A shape of the bag-like exterior material 202 can be selected from a flat type (thin type), a square type, a cylinder type, a coin type, and a button type. In an example of the exterior material, an external material for a small type battery which is to be mounted on a portable electronic device or the like, for example, and an external material for a large type battery which is to be mounted on a two-wheel to four-wheel car or the like are included, according to a size of the battery.

As the laminate film, a multi-layer film in which a metal layer is interposed between resin layers is used. The metal layer is preferably an aluminum foil or an aluminum alloy foil for weight reduction. As the resin layer, a polymer material, such as polypropylene (PP), polyethylene (PE), nylon, polyethylene-terephthalate (PET) or the like can be used. The laminate film is sealed by heat fusion, and thereby can be formed in a shape of the exterior material.

The metal container is made of aluminum or aluminum alloy or the like. The aluminum alloy is preferably an alloy containing an element, such as magnesium, zinc, silicon or the like. When transition metal, such as iron, copper, nickel, chrome or the like is contained in the alloy, its amount is preferably set to not more than 100 ppm. The reason is because if its amount exceeds 100 ppm, its workability might be deteriorated.

2) Positive Electrode 205

The positive electrode 205 has a structure that the positive electrode mixture layer 205b containing the active material is carried on one side or both sides of the positive electrode collector 205a.

It is preferable that a thickness of the above-described positive electrode mixture layer 205b at one side is in a range of not less than 1.0 μm, and not more than 150 μm, from the point of holding a large current discharge characteristic and a cycle life of the battery. Accordingly, when the positive electrode mixture layers 205b are carried on the both surfaces of the positive electrode collector 205a, the total thickness is preferably in a range of not less than 20 μm, and not more than 200 μm. A more preferable range of a thickness at one side is not less than 20 μm, and not more than 120 μm. When the thickness is within this range, the large current discharge characteristic and the cycle life are improved.

The positive electrode mixture layer 205b may contain a conductive agent, in addition to the positive electrode active material.

In addition, the positive electrode mixture layer 205b may contain a binding agent for binding the positive electrode materials to each other.

It is preferable that various oxides, such as manganese dioxide, lithium manganese composite oxide, lithium-containing cobalt oxide ($LiCOO_2$, for example), lithium-containing nickel cobalt oxide ($LiNi_{0.8}CO_{0.2}O_2$, for example), lithium manganese composite oxide ($LiMn_2O_4$, $LiMnO_2$) are used, as the positive electrode active material, because high voltage can be obtained.

As the conductive agent, acetylene black, carbon black, graphite or the like can be listed.

As a specific example of the binding agent, polytetrafluoroethlene (PTFE), polyvinylidene fluoride (PVdF), ethylene-propylene-diene copolymer (EPDM), styrene-butadiene rubber (SBR) or the like can be used, for example.

Regarding a preferable mixing ratio of the active material, the conductive agent and the binding agent in the positive electrode mixture layer 205b, the active material is in a range of not less than 80 mass %, and not more than 95 mass %, the conductive agent is in a range of not less than 3 mass %, and not more than 18 mass %, and the binding agent is in a range of not less than 2 mass %, and not more than 7 mass %. It is preferable that these ranges are set, because an excellent large current discharge characteristic and cycle life can be obtained.

As the collector 205a, a conductive substrate of a porous structure or a nonporous conductive substrate can be used. A thickness of the collector 205a is preferably not less than 5 μm, and not more than 20 μm. This is because, if the thickness is in this range, the balance between an electrode strength and weight saving can be obtained.

The positive electrode 205 is manufactured by suspending the active material, the conductive agent and the binding agent in a generally used solvent to prepare slurry, applying this slurry to the collector 205a, and drying, and then pressing the dried matter. The positive electrode 205 may be manufactured by forming the active material, the conductive agent and the binding agent in a pellet shape to obtain the positive electrode mixture layer 205b, and by forming this on the collector 205a.

Regarding a mixing ratio of the active material, the conductive agent and the binding agent in the positive electrode mixture layer, it is preferable to set ranges, of not less than 80 mass %, and not more than 95 mass % for the active material, not less than 3 mass %, and not more than 18 mass % for the conductive agent, and not less than 2 mass %, and not more than 7 mass % for the binding agent, because an excellent large current discharge characteristic and cycle life can be obtained.

3) Negative Electrode 203

The negative electrode 100 of the first embodiment is used as the negative electrode 203.

The negative electrode 203 has a structure that the negative electrode mixture layer 203b containing the negative electrode active material and other negative electrode material is carried in the form of a layer on one side or both sides of the negative electrode collector 203a.

4) Electrolyte

As the electrolyte, nonaqueous electrolyte solution, electrolyte impregnated type polymer electrolyte, polymer electrolyte, or inorganic solid electrolyte can be used.

The nonaqueous electrolyte solution is a liquid electrolyte solution which is prepared by dissolving the electrolyte in a nonaqueous solvent, and is held in voids in the electrode group.

As the nonaqueous solvent, a nonaqueous solvent mainly containing a mixed solvent of propylene carbonate (PC) and ethylene carbonate (EC), and a nonaqueous solvent (hereinafter referred to as a second solvent) having a lower viscosity than PC and EC is preferably used.

As the second solvent, chain carbon is preferable, for example, and in the chain carbon, dimethyl carbonate (DMC), methyl ethyl carbonate (NEC), diethyl carbonate (DEC), ethyl propionate, methyl propionate, γ-butyrolactone (BL), acetonitrile (AN), ethyl acetate (EA), toluene, xylene, or methyl acetate (MA), or the like can be listed. These second solvents can be used solely or in the form of a mixture of two or more kinds. Particularly, the second solvent in which the number of donors is not more than 16.5 is more preferable. Because, the second solvent like this properly solvates lithium ion, and when Li ion is inserted into the active material, it is moderately extracted.

A viscosity of the second solvent is preferably not more than 2.8 cp at 25° C. A blending amount of ethylene carbonate or propylene carbonate in the mixed solvent is preferably not less than 1.0%, and not more than 80% by volume ratio. A more preferable blending amount of ethylene carbonate or propylene carbonate is not less than 20%, and not more than 75% by volume ratio. It is preferable that the blending amount thereof is in a range of not less than 20% and not more than 75% from the viewpoint of the conductivity of the electrolyte solution, and this is because, if the second solvent is more than 75%, a problem in solubility may be generated.

As the electrolyte contained in the nonaqueous electrolyte solution, lithium salt (electrolyte), such as lithium perchlorate ($LiClO_4$), lithium hexafluorophosphate ($LiPF_6$) lithium borofluoride ($LiBF_4$), lithium arsenic hexafluoride ($LiAsF_6$) lithium trifluoromethanesulfonate ($LiCF_3SO_3$), bis-trifluoromethylsulfonyl imide lithium [$LiN(CF_3SO_2)_2$] is listed. Out of them, it is preferable to use $LiPF_6$, $LiBF_4$. The reason is because the oxidation-reduction potential in the case of using Si as the negative electrode is stable.

An amount of dissolution of the electrolyte to the nonaqueous solvent is preferably not less than 0.5 mol/l, and not more than 2.0 mol/l. The reason is because, if smaller than 0.5 mol/l, the conductivity is insufficient, and if larger than 2.0 mol/l, a problem in solubility may be generated.

5) Separator 204

When the nonaqueous electrolyte solution is used, and when the electrolyte impregnated polymer electrolyte is used, the separator 204 can be used. A porous separator is used as the separator 204. As the material of the separator 204, a porous film containing polyethylene, polypropylene, or polyvinylidene fluoride (PVdF), synthetic resin nonwoven fabric or the like can be used. Above all, a porous film of polyethylene, or polypropylene, or a porous film formed of the both is preferable, because the safety of a secondary battery can be improved.

A thickness of the separator 204 is preferably set to not more than 30 μm. If the thickness exceeds 30 μm, an internal resistance might be increased, because a distance between the positive and negative electrodes is increased. In addition, a lower limit value of the thickness is preferably set to 5 μm. If the thickness is set to less than 5 μm, the strength of the separator 204 is considerably decreased, and thereby an internal short might easily be generated. An upper limit value of the thickness is more preferably set to 25 μm, and a lower limit value of the thickness is more preferably set to 1.0 μm.

A heat shrinkage percentage of the separator 204 is preferably not more than 20% when held for one hour on the condition of 120° C. If the heat shrinkage percentage exceeds 20%, a possibility to cause short circuit by heating increases.

A porosity of the separator 204 is preferably in a range of not less than 30%, and not more than 70%. This is because of the following reason. If the porosity is set to less than 30%, it might become difficult to obtain a high electrolyte holding property in the separator 204. On the other hand, if the porosity exceeds 70%, the sufficient strength of the separator 204 might not be obtained. A more preferable range of the porosity is not less than 35%, and not more than 60%.

An air permeability of the separator 204 is preferably not more than 500 second/1.00 $cm^3$. If the air permeability exceeds 500 second/1.00 $cm^3$, it might become difficult to obtain a high lithium ion mobility in the separator 204. In addition, a lower limit value of the air permeability is 30 second/1.00 $cm^3$. This is because, if the air permeability is set to less than 30 second/1.00 $cm^3$, the sufficient strength of the separator might not be obtained.

An upper limit value of the air permeability is more preferably set to 300 second/1.00 $cm^3$, and a lower limit value is more preferably set to 50 second/1.00 $cm^3$.

Next, a battery pack using the above-described nonaqueous electrolyte secondary battery will be described.

A battery pack according to an embodiment has one or more nonaqueous electrolyte secondary batteries (that is, unit battery) according to the above-described embodiment. When a plurality of unit batteries are included in the battery pack, the respective unit batteries are arranged to be electrically connected in series, in parallel, or in series and parallel.

A battery pack 300 will be specifically described with reference to a conceptual diagram of FIG. 4 and a block diagram of FIG. 5. The battery pack 300 shown in FIG. 4 uses the flat nonaqueous electrolyte battery 200 shown in FIG. 2, as a unit battery 301.

A plurality of the unit batteries 301 are laminated so that negative electrode terminals 302 and positive electrode terminals 303 which extend outside are aligned in the same direction, and are bound by an adhesive tape 304, to compose an assembled battery 305. These unit batteries 301 are electrically connected in series with each other, as shown in FIG. 5.

A printed wiring board 306 is arranged to face side surfaces of the unit batteries 301 from which the negative electrode terminals 302 and the positive electrode terminals 303 extend. A thermistor 307, a protection circuit 308 and a terminal 309 for conduction to an external device are mounted on the printed wiring board 306, as shown in FIG. 5. In addition, an insulating plate (not shown) is attached to a surface of the printed wiring board 306 facing the assembled battery 305, so as to avoid unnecessary connection with the wiring of the assembled battery 305.

A positive electrode side lead 310 is connected to the positive electrode terminal 303 located at the lowermost layer of the assembled battery 305, and its tip is inserted into a positive electrode side connector 311 of the printed wiring board 306, and is electrically connected thereto. A negative electrode side lead 312 is connected to the negative electrode terminal 302 located at the uppermost layer of the assembled battery 305, and its tip is inserted into a negative electrode side connector 313 of the printed wiring board 306, and is electrically connected thereto. These connectors 311, 313 are connected to the protection circuit 308 through wirings 314, 315 formed in the printed wiring board 306, respectively.

The thermistor 307 is used for detecting a temperature of the unit battery 305, and its detection signal is transmitted to the protection circuit 308. The protection circuit 308 can break a plus side wiring 316a and a minus side wiring 316 between the protection circuit 308 and the terminal 309 for conduction to an external device, under a prescribed condition. The prescribed condition is a time when a detection temperature of the thermistor 307 becomes not less than a prescribed temperature, for example. In addition, the prescribed condition is a time when over-charge, over-discharge, overcurrent or the like of the unit battery 301 is detected. Detection of this over-charge or the like is performed for each unit battery 301, or for the whole unit batteries 301. In the case of detecting each of the unit batteries 301, a battery voltage may be detected, or a positive electrode potential or a negative electrode potential may be detected. In the case of the latter, a lithium electrode which is used as a reference electrode is inserted in each of the unit batteries 301. In the case of FIG. 4 and FIG. 5, wirings 317 for voltage detection are connected to the respective unit batteries 301, and the detection signals are transmitted to the protection circuit 308 through these wirings 317.

At three side surfaces of the assembled battery 305 except a side surface from which the positive terminals 303 and the negative terminals 302 project, protection sheets 318 composed of rubber or resin are respectively arranged.

The assembled battery 305, along with the respective protection sheets 318 and the printed wiring board 306 are housed in a housing container 319. That is, the protection sheets 318 are respectively arranged on the both inner side surfaces in the long side direction, and on an inner side surface in the short side direction, and the printed wiring board 306 is arranged on an inner side surface at the opposite side in the short side direction. The assembled battery 305 is located in a space surrounded by the protection sheets 318 and the printed wiring board 306. A lid 320 is attached on an upper surface of the housing container 319.

In addition, a heat shrinkable tape may be used, in place of the adhesive tape 304, for fixing of the assembled battery 305. In this case, the protection sheets are arranged at the both side surfaces of the assembled battery, and a heat shrinkable tape is wound around them, and then the heat shrinkable tape is thermally shrunk, to bind the assembled battery.

Figure 4:
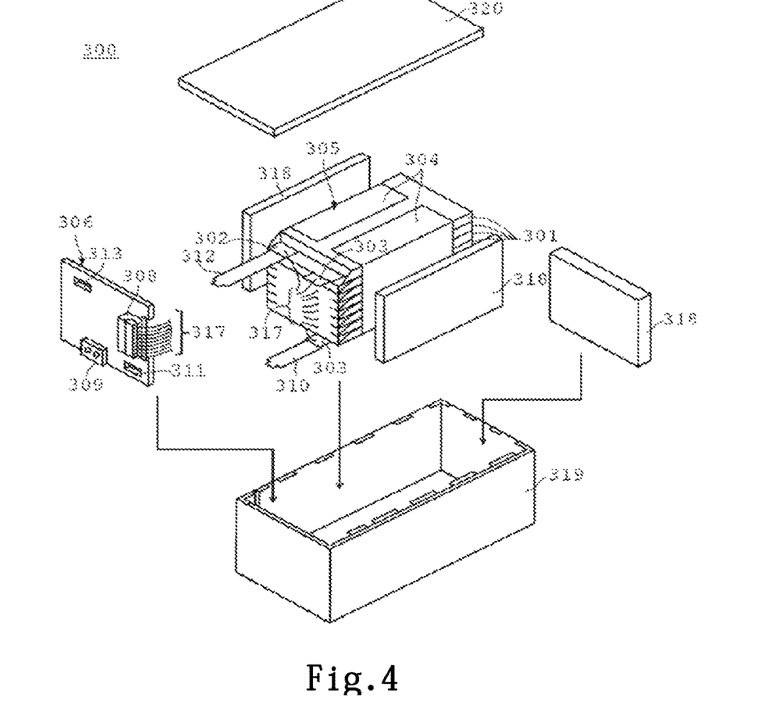
FIG. 4 is a conceptual diagram of a battery pack of a third embodiment.
Figure 5:
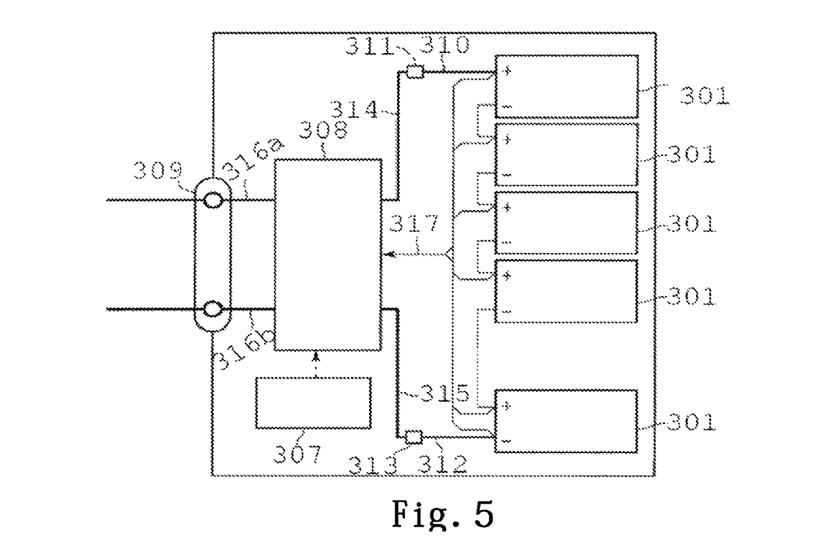
FIG. 5 is a block diagram showing an electric circuit of the battery pack of the third embodiment.

In FIG. 4, FIG. 5, a configuration in which the unit batteries 301 are connected in series is shown, but in order to increase battery capacity, they may be connected in parallel, or the series connection and parallel connection thereof may be combined. Assembled battery packs can be further connected in series, parallel.

According to the present embodiment as described above, the battery pack is provided with the nonaqueous electrolyte secondary batteries having an excellent charge/discharge cycle performance in the above-described embodiment, and thereby it is possible to provide the battery pack having an excellent charge/discharge cycle performance.

In addition, an aspect of the battery pack is appropriately changed according to its usage. As a usage of the battery pack, one requiring a small size and a large capacity is preferable. Specifically, a usage for a power source for a smartphone, a digital camera, and a usage for an onboard use, such as a two-wheel to four-wheel hybrid electric car, a two-wheel to four-wheel electric car, an assist bicycle or the like, can be listed.

EXAMPLE

Hereinafter, specific examples will be listed, and the effects thereof will be described. However, the present invention is not limited to these examples.

Example 1

Pulverization of SiO, kneading, forming of a composite body, and burning of the composite body in Ar gas were performed by the following conditions, and thereby a negative electrode active material was obtained.

Pulverization of SiO was performed as follows. A pulverization processing was performed to raw material SiO powder, by a continuous bead mill apparatus, using beads of a bead diameter of 0.5 μm, and using ethanol as a dispersion medium for a prescribed time. Further, this SiO powder was pulverized by a planetary ball mill using balls of 0.1 μm, and using ethanol as a dispersion medium, and thereby SiO fine powder was manufactured.

The silicon monoxide powder obtained by the pulverization processing, graphite powder of 6 μm were compounded with hard carbon in the following method. 2.8 g SiO powder, 0.7 g graphite powder, 0.06 g carbon fiber with an average diameter of 180 nm were added to a mixed solution of 4.0 g furfuryl alcohol, 10 g ethanol, and 0.125 g water, and they were subjected to a kneading processing by a kneading machine, to be formed in a slurry form. 0.2 g dilute hydrochloric acid functioning as a polymerization catalyst of furfuryl alcohol was added to the slurry after kneading, and they were left and dried at room temperature, and then were solidified, and thereby a carbon composite body was obtained.

The obtained carbon composite body was burned at 1050° C. for three hours in Ar gas, and was cooled to the room temperature, and then was pulverized and was put through a sieve of a diameter of 30 μm, and thereby a negative electrode active material was obtained.

X-ray photoelectron spectroscopy measurement was performed to this negative electrode active material, to obtain a ratio (mol %) occupied by carbon (C1s) on the surface, and it was 67 mol %.

Subsequently, 15 mass % graphite of an average diameter of 6 μm, and 8 mass % polyvinyl alcohol which had been liquidized using hot water as a dispersion medium, having a saponification degree 97%, and an average polymerization degree 1000 were kneaded to the obtained sample at this ratio, and this slurry was applied on a copper foil with a thickness of 12 μm, and was dried at 100° C. for 2 hours, and thereby a negative electrode was manufactured. Regarding other components in this example, 92% wt. % lithium nickel manganese cobalt composite oxide (LiNi1/3Mn1/3Co1/3O2) powder that is an active material, 3 wt. % acetylene black, 5 wt. % polyvinylidene fluoride (PVdF) were added to N-methylpyrrolidone, and they were mixed to prepare slurry, and this slurry was applied to an aluminum foil (collector) with a thickness of 15 μm, and was dried, and then was pressed, and thereby a positive electrode having a density of 3.2 g/cm³ was obtained, and this was used as the positive electrode, as the separator, a polyethylene porous film with a thickness of 20 μm was used, as the electrolyte, $LiPF_6$ (1M) was used, and as the electrolyte solution, an EC/DEC (volume ratio EC:DEC=1:2) solution was used. After rolling, a charge/discharge test which will be described later was performed, and a charge/discharge characteristic was evaluated.

(Charge/discharge Test)

After having been cut into a prescribed size, it was dried in vacuum at 100° C. for 12 hours, to obtain a test electrode. A battery in which counter electrodes and a reference electrode are made of metal Li, an electrolyte solution is an EC/DEC (volume ratio EC:DEC=1:2) solution of $LiPF_6$ (1M) was manufactured in an argon atmosphere, and a charge/discharge test thereof was performed. Regarding the condition of the charge/discharge test, charging was performed at a current density of 1 mA/cm² until 0.01 V of the potential difference between the reference electrode and the test electrode, and further constant voltage charging was performed at 0.01 V for 16 hours, and discharging was performed at a current density of 1 mA/cm² until 1.5 V. Further, a cycle to perform charging at a current density of 1 mA/cm² until 0.01 V of the potential difference between the reference electrode and the test electrode, and to perform discharging at a current density of 1 mA/cm² until 1.5 V was performed by 100 times, and a maintenance factor of the discharge capacity and a charge/discharge efficiency at the 100th cycle to the first cycle were measured.

The following examples and comparative examples have been summarized in a table 1. Regarding the following examples and comparative examples, only portions different from the example will be described, and since other composition and evaluation procedure were performed in the same manner as the example 1, the description thereof will be omitted.

Example 2

The silicon monoxide powder obtained by the pulverization processing, graphite powder of 6 μm were compounded with hard carbon in the following method. 2.8 g SiO powder, 0.7 g graphite powder, 0.06 g carbon fiber with an average diameter of 180 nm were added to a mixed solution of 1.0 g furfuryl alcohol, 7 g ethanol, and 0.05 g water, and they were subjected to a kneading processing by a kneading machine, to be formed in a slurry form. 0.05 g dilute hydrochloric acid functioning as a polymerization catalyst of furfuryl alcohol was added to the slurry after kneading, and they were left and dried at room temperature, and then were solidified, and thereby a carbon composite body was obtained.

The obtained carbon composite body was burned at 1050° C. for three hours in Ar gas, and was cooled to the room temperature, and then was pulverized and was put through a sieve of a diameter of 30 μm, and thereby a negative electrode active material was obtained.

X-ray photoelectron spectroscopy measurement was performed to this negative electrode active material, to obtain a ratio (mol %) occupied by carbon (C1s) on the surface, and it was 37 mol %.

Subsequently, 15 mass % graphite of an average diameter of 6 μm, and 8 mass % polyvinyl alcohol which had been liquidized using hot water as a dispersion medium, having a saponification degree 99.2%, and an average polymerization degree 1000 were kneaded to the obtained sample at this ratio, and this slurry was applied on a copper foil with a thickness of 12 μm, and was dried at 100° C. for 2 hours, and thereby a negative electrode was manufactured. After rolling, a charge/discharge test which will be described later was performed, and a charge/discharge characteristic was evaluated.

Example 3

The negative electrode active material obtained by the example 1 of 10 g was dispersed into ethanol/water/sulfuric acid=1/0.5/0.05 (wt/wt/wt) of 7 g, and then, sucrose of 2 g was inputted therein, and they were dried and solidified at 80° C. for two hours, and then were subjected to a burning processing at 1100° C. for three hours under Ar atmosphere. They were cooled to the room temperature, and pulverized, and then put through a sieve of a diameter of 30 μm, and thereby a negative electrode active material was obtained.

X-ray photoelectron spectroscopy measurement was performed to this negative electrode active material, to obtain a ratio (mol %) occupied by carbon (C1s) on the surface, and it was 92 mol %.

Subsequently, 15 mass % graphite of an average diameter of 6 μm, and 8 mass % polyvinyl alcohol which had been liquidized using hot water as a dispersion medium, having a saponification degree 99.2%, and an average polymerization degree 1000 were kneaded to the obtained sample at this ratio, and this slurry was applied on a copper foil with a thickness of 12 μm, and was dried at 100° C. for 2 hours, and thereby a negative electrode was manufactured. After rolling, a charge/discharge test which will be described later was performed, and a charge/discharge characteristic was evaluated.

Example 4

At the time of manufacturing a negative electrode using the negative electrode active material of the example 1, the manufacturing and evaluation thereof were performed in the same method as the example 1, except that polyvinyl alcohol of a saponification degree 88% and an average polymerization degree 1000 was used as the binding agent.

Example 5

The silicon monoxide powder obtained by the pulverization processing, and graphite powder of 3 μm were compounded with the carbonaceous material in the following method. 2.8 g SiO powder, 0.1 g graphite powder, 0.01 g carbon fiber with an average diameter 180 nm were added to a mixed solution of 3.0 g resol resin and 5 g ethanol, and they were subjected to a kneading processing by a kneading machine, to be formed in a slurry form. After kneading, ethanol was transpired at 80° C., and then it was inputted in an oven at 150° C., and was subjected to solidification reaction for two hours, and thereby a carbon composite body was obtained.

The obtained carbon composite body was burned at 1100° C. for three hours in Ar gas, and was cooled to the room temperature, and then was pulverized and was put through a sieve of a diameter of 30 μm, and thereby a negative electrode active material was obtained under the sieve.

X-ray photoelectron spectroscopy measurement was performed to this negative electrode active material, to obtain a ratio (mol %) occupied by carbon (C1s) on the surface, and it was 64 mol %.

Subsequently, 15 mass % graphite of an average diameter of 6 μm, and 8 mass % polyvinyl alcohol which had been liquidized using hot water as a dispersion medium, having a saponification degree 99.2%, and an average polymerization degree 1000 were kneaded to the obtained sample at this ratio, and this slurry was applied on a copper foil with a thickness of 12 μm, and was dried at 100° C. for 2 hours, and thereby a negative electrode was manufactured.

After rolling, a charge/discharge test which will be described later was performed, and a charge/discharge characteristic was evaluated.

Comparative Example 1

At the time of manufacturing a negative electrode using the negative electrode active material of the example 1, the manufacturing and evaluation thereof were performed in the same method as the example 1, except that polyvinyl alcohol of a saponification degree 72% and an average polymerization degree 1000 was used as the binding agent.

Comparative Example 2

97.5 mass % artificial graphite having an average particle diameter of about 10 μm, as the negative electrode active material, and 2.5 mass % polyvinyl alcohol of a saponification degree 72% and an average polymerization degree 1000, as the binding agent, were made into a slurry form with hot water, so that a solid content density thereof is 50 mass, and this slurry was applied on a copper foil with a thickness of 12 μm, and was dried at 100° C. for 2 hours, and thereby a negative electrode was manufactured. After rolling, a charge/discharge test was performed in the same manner as described above, and a charge/discharge characteristic was evaluated.

Comparative Example 3

A negative electrode was manufactured in the same method as the comparative example 2, except that polyvinyl alcohol of a saponification degree 96% and an average polymerization degree 1000 was used, and a charge/discharge characteristic was evaluated,

TABLE 1

| | discharge capacity [mAh/g] | capacity maintenance rate (after 100 cycles) % | charge/ discharge efficiency (after 100 cycles) % | saponification degree % |
| --- | --- | --- | --- | --- |
| example 1 | 787 | 97 | 99.8 | 97 |
| example 2 | 912 | 91 | 99.6 | 99.2 |
| example 3 | 730 | 90 | 99.5 | 99.2 |
| example 4 | 770 | 95 | 99.7 | 88 |
| example 5 | 821 | 98 | 99.8 | 99.2 |
| comparative example 1 | 621 | 70 | 97.5 | 72 |
| comparative example 2 | 323 | 93 | 99.7 | 72 |
| comparative example 3 | 318 | 91 | 99.7 | 96 |

It is understood that the negative electrode of the present invention has the good cycle characteristic from the result listed in table 1. In the comparative example 1, as the charge/discharge proceeds, the conductive path is blocked due to the defect such as reduction in the binding force of the mutual structure materials forming the negative electrode mixture layer, and accordingly the cycle characteristic has been deteriorated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode for a nonaqueous electrolyte secondary battery, comprising:
    an electrode mixture layer comprising an active material, a conductive agent, and a binding agent binding the active material and the conductive agent; and
    a collector on which the electrode mixture layer is laminated;
    wherein
    the active material comprises particles of a composite body comprising a carbonaceous material, a metal phase and a phase of an oxide of the metal dispersed in the carbonaceous material;
    the metal and the metal of the oxide is at least one kind of an element selected from a group consisting of Si, Sn, Al, In, Ga, Pb, Ti, Ni, Mg, W, Mo, Fe and an alloy thereof,
    an average size of the metal oxide phase is from 50 nm to 1000 nm,
    a ratio of carbon to total elements on a surface of the composite body particle is from 40 mole % to 90 mole %, and
    the binding agent is a polyvinyl alcohol resin having a saponification degree of from 87 mole % to 99.9 mole %.

2. The negative electrode according to claim 1, wherein the carbonaceous material comprises one or more selected from the group consisting of coke, a natural graphite, an artificial graphite, a thermal decomposition carbon, a sintered body of an organic polymer compound, a carbon fiber and active coal.

3. The negative electrode according to claim 1, wherein the conductive agent is selected from the group consisting of acetylene black, carbon black, graphite and combinations thereof.

4. The negative electrode according to claim 1, wherein
the metal phase is Si,
the metal oxide phase is $SiO_2$, and
the Si metal phase is in a form of microcrystals bound to the $SiO_2$ phase.

5. The negative electrode according to claim 4, wherein a half-value width of a diffraction peak on a Si (220) surface in a powder X-ray diffraction measurement of the active material is from 1.5° to 8.0°.

6. The negative electrode according to claim 4, wherein a mole ratio of Si/carbon is from 0.2 to 2.

7. The negative electrode according to claim 4, wherein a mole ratio of $Si/SiO_2$ is from 0.6 to 1.5.

8. A nonaqueous electrolyte secondary battery, comprising:
the negative electrode for a secondary battery according to claim 4,
wherein a particle diameter of the negative electrode active material is from 5 µm to 100 µm, and a specific surface area of the negative electrode active material is from 0.5 $m^2$/g to 10 $m^2$/g.

9. A nonaqueous electrolyte secondary battery, comprising:
an external material;
a positive electrode housed in the external material;
a separator housed in the external material;
a negative electrode according to claim 4 housed in the external material spatially separately from the positive electrode, while the separator is interposed therebetween; and
a nonaqueous electrolyte filled in the exterior material.

10. A battery pack, comprising:
one or more nonaqueous electrolyte secondary batteries according to claim 9.

11. The battery pack according to claim 10, further comprising:
a protection circuit; and
a terminal for conduction to an external device.

12. A nonaqueous electrolyte secondary battery, comprising:
the negative electrode for a secondary battery according to claim 1,
wherein a particle diameter of the negative electrode active material is from 5 µm to 100 µm, and a specific surface area of the negative electrode active material is from 0.5 $m^2$/g to 10 $m^2$/g.

13. A nonaqueous electrolyte secondary battery, comprising:
an external material;
a positive electrode housed in the external material;
a separator housed in the external material;
a negative electrode according to claim 1 housed in the external material spatially separately from the positive electrode, while the separator is interposed there between; and
a nonaqueous electrolyte filled in the exterior material.

14. A battery pack, comprising:
one or more nonaqueous electrolyte secondary batteries according to claim 13.

15. The battery pack according to claim 14, further comprising:
a protection circuit; and
a terminal for conduction to an external device.

* * * * *